United States Patent [19]

Curto

[11] 4,233,262
[45] Nov. 11, 1980

[54] METHOD OF FORMING BLOWN POLYETHYLENE TEREPHTHALATE CONTAINERS

[75] Inventor: Nicholas J. Curto, Monroe, Mich.

[73] Assignee: Owens-Illinois, Inc., Toledo, Ohio

[21] Appl. No.: 2,511

[22] Filed: Jan. 11, 1979

Related U.S. Application Data

[63] Continuation of Ser. No. 789,483, Apr. 21, 1977, abandoned.

[51] Int. Cl.³ .............................................. B29C 17/07
[52] U.S. Cl. ................................... 264/509; 264/526; 264/529; 264/532
[58] Field of Search .............. 264/509, 521, 523, 526, 264/529, 530, 532, 535; 215/1 C

[56] References Cited

U.S. PATENT DOCUMENTS

| | | |
|---|---|---|
| 3,754,851 | 8/1973 | Reilly et al. ...................... 264/532 X |
| 3,956,441 | 5/1976 | Unlig ................................... 264/530 |
| 4,042,657 | 8/1977 | Ostapchenko et al. .......... 264/532 X |

Primary Examiner—Jan H. Silbaugh
Attorney, Agent, or Firm—Charles S. Lynch; Richard D. Heberling; E. J. Holler

[57] ABSTRACT

A method is disclosed for blow molding polyethylene terephthalate preforms, such as injection molded parisons, to achieve exterior surface indentations on blown containers without using profiled mold cavity walls. In the method, a profile is molded or otherwise formed in the exterior wall of the preform, defining a preform wall portion having sections of different thicknesses. Then, the preform is blow molded under conditions so that the polyethylene terephthalate material strain hardens in order to cause the different wall thicknesses to expand and stretch proportionately. As a result, the blown containers formed by this method include a surface contour which is essentially proportionately shaped to the surface profile formed on the pre-existing preforms.

8 Claims, 9 Drawing Figures

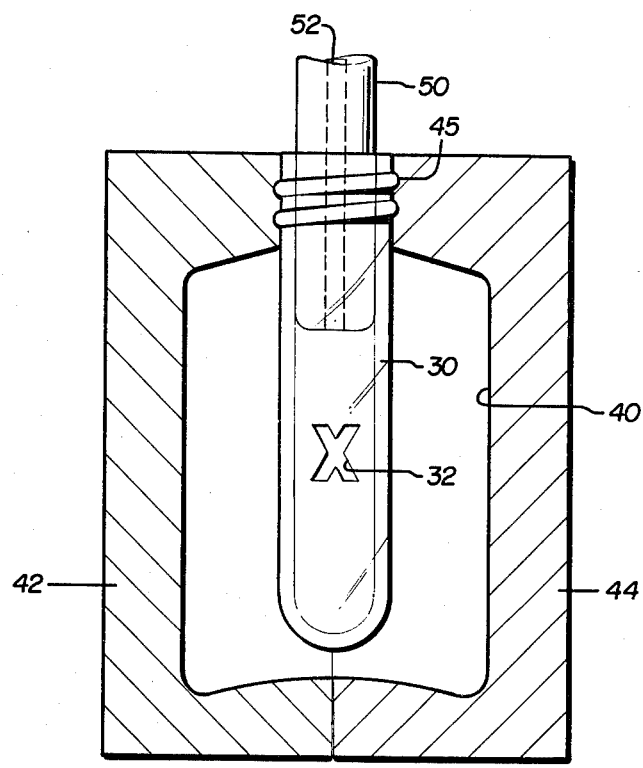
FIG. 1
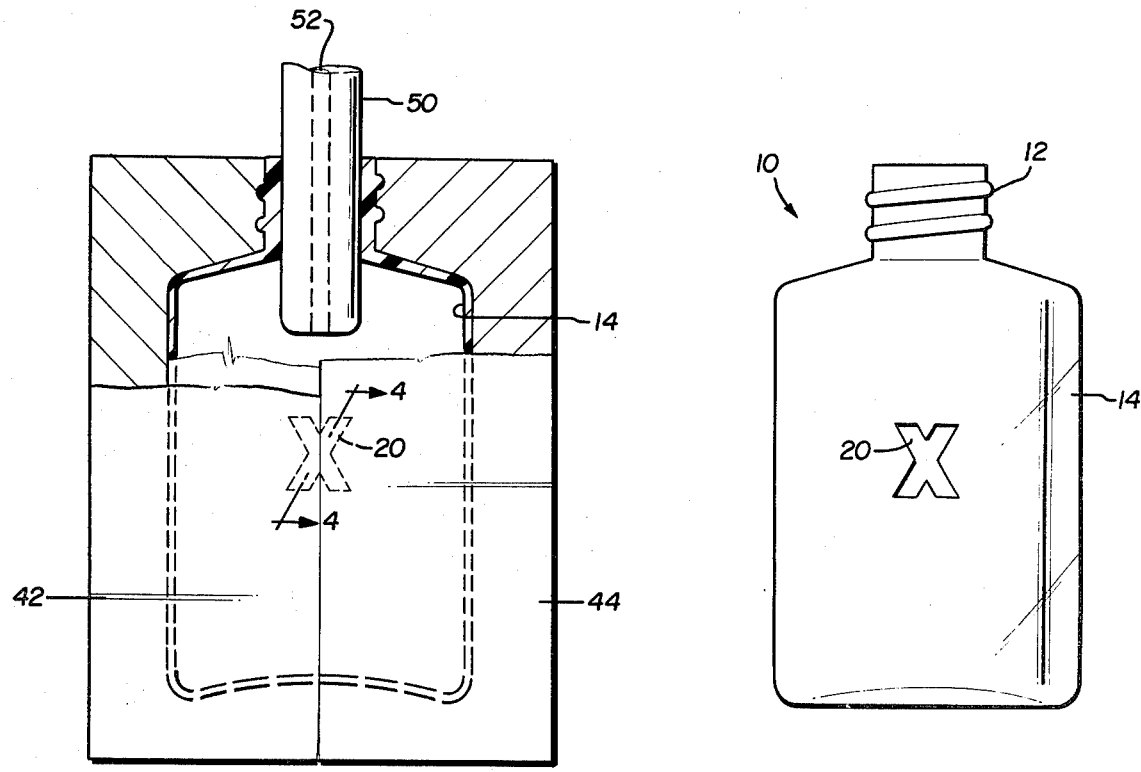
FIG. 2
FIG. 3

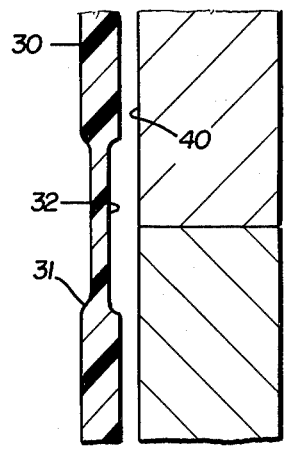 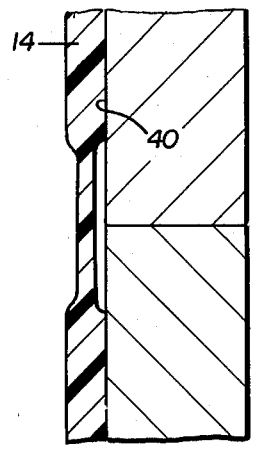 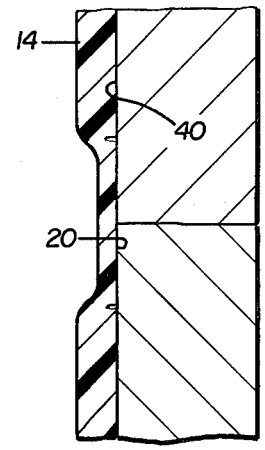 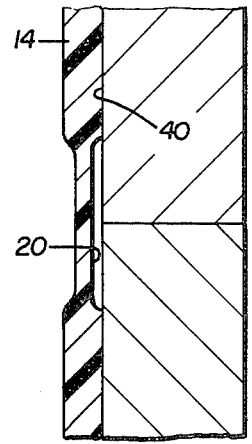
FIG. 4    FIG. 5    FIG. 6    FIG. 7
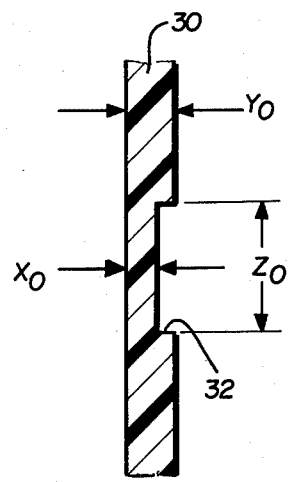 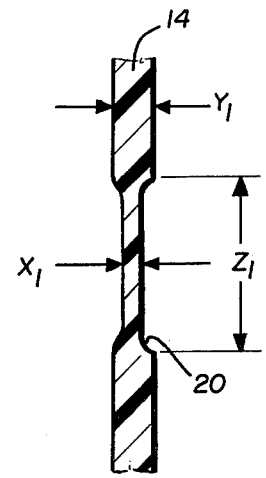
FIG. 8    FIG. 9

METHOD OF FORMING BLOWN POLYETHYLENE TEREPHTHALATE CONTAINERS

This is a continuation of application Ser. No. 789,483 filed Jul. 21, 1977, now abandoned.

BACKGROUND OF THE INVENTION

1. Field of the Invention

This disclosure relates generally to a method of forming blown containers, and more particularly to a method of forming blown containers having exterior surface contours.

2. The Prior Art

Prior to the present invention, patterns, grooves, logos or other surface contours have been imparted to the exterior surface of blown thermoplastic containers in the final blow molding step by contours on the interior side walls of the blow mold cavity. Examples of bottles formed in this manner are shown in U.S. Pat. Nos. 3,403,804 and 3,397,724.

This procedure has been generally undesirable because of the expenses involved in machining or otherwise providing the contours on the mold walls and because the contoured molds can only be used for a particular job. Unfortunately, these problems have been heretofore unavoidable since no satisfactory alternative has been available.

The present invention overcomes these problems by applying a desired contour to a parison or preform, particularly of polyethylene terrphthalate material, and then proportionately enlarging that contour as the parison is blown into the final article within a standard blow mold cavity having smooth interior walls.

Of course, parisons and preforms have been provided with contours and varying wall thicknesses prior to the present invention. However, such contours have conventionally been provided either: to achieve an interior reinforcement in the final container, as shown by U.S. Pat. No. 3,114,932; to achieve a visual effect, as shown by U.S. Pat. No. 3,420,924; or to form a reinforced bottle portion, as shown by U.S. Pat. Nos. 3,294,883, 3,137,748 and 3,754,851.

Additionally, the prior art recognizes that polyethylene terephthalate is suitable for forming blown bottles, as shown by U.S. Pat. No. 3,733,309.

In short, however, the prior art does not recognize that profiling may be provided to a thermoplastic preform to achieve exterior contours on a blown container. Additionally, the prior art does not teach that portions of a preform having differential thicknesses may be proportionately reduced in thickness during a blow molding operation.

SUMMARY OF THE INVENTION

This invention relates primarily to a method of imparting exterior surface profiles or contours to a blown thermoplastic container, by imparting a proportionately shaped surface contour to a blowable preform and then expanding the contour proportionately with the other portions of the preform during the blow molding operation. The method is particularly suited for polyethylene terephthalate, because this material exhibits the characteristic of strain hardening, thus enabling thick and thin sections of a preform to expand and stretch proportionately and carry the preform profile over to the blown container. This method distinguishes significantly from prior art methods where the thin sections of a parison are expanded to a greater extent in the blowing operation, such that the thick and thin sections are expanded non-proportionately.

More specifically, the method includes closing the sections of a blow mold around a blowable preform of suitable thermoplastic material, such as polyethylene terephthalate. In accordance with the invention, the preform includes a profiled exterior surface region defined by exterior surface indentations forming preform wall sections which are thinner than the remaining wall sections. Then, in an essentially single operation, blow fluid is injected into the interior of the preform (a) to expand the preform outwardly, (b) to expand the thin wall sections of the preform essentially proportionately with the remaining wall sections of the preform, (c) to expand the profiled preform surface region into engagement with an essentially smooth interior mold wall surface and (e) to form a blown plastic container having an exterior surface indentation. Additionally, the preform may optionally be axially stretched just prior to or during the blowing operation.

When using polyethylene terephthalate material, the preform should be blown within a general range of specified conditions, so that the material will strain harden during the blow molding operation to achieve the proportionate expansion in the thin and thicker wall sections of the preform. These parameters and conditions may vary in relationship to one another, but generally fall in the following ranges. First, the preform should be at a temperature within the range of between about 75 degrees C. and 110 degrees C. depending upon the molecular weight (or inherent viscosity) of the material, with lower molecular weight materials generally requiring lower forming temperatures. Second, the material should be expanded at a rate of about one inch per inch per second; that is, the material should be expanded approximately one inch per second for every inch of starting length. Third, the blow molding operation should be carried out by a blow fluid at a pressure of between about 100 and 600 psi; and more preferably by initialling inflating the parison with fluid at a pressure of between about 150 and about 200 psi and then completing the blowing operation with fluid at a pressure of between about 350 and 550 psi. These parameters may vary slightly from the specified ranges, inasmuch as these ranges are derived from laboratory observations.

Accordingly, the present invention provides several significant advantages, including primarily the ability to use the same blow molds for several different distinctive bottle designs. This is of particular importance from a commercial standpoint because (1) it is now unnecessary to machine separate blow mols for each bottle design and (2) job change overs are not required.

Additionally, it has previously been difficult to achieve sharp details of grooves and contours in blow molded containers. In this invention, the details are present in the preform and are simply carried over into the container.

These and other advantages and meritorious features of the present invention will be more readily appreciated and understood from the following detailed description and appended claims.

BRIEF DESCRIPTION OF THE DRAWINGS

FIG. 1 is a schematic illustration, showing a profiled preform enclosed within a blow mold cavity;

FIG. 2 is a schematic illustration showing the preform blown to a container within the blow mold cavity;

FIG. 3 illustrates the blown container having an exterior surface indentation proportionately shaped to the profile which previously existed in the blowable preform;

FIGS. 4–7 are enlarged fragmentized views, illustrating the manner in which the preform expands into engagement with the mold walls in the region of the external surface indentation; and FIGS. 8 and 9 are schematic illustrations depicting the proportionate expansions between the thin and thick regions of the preform.

DETAILED DESCRIPTION OF THE PREFERRED EMBODIMENT

Referring now more particularly to the drawings, the overall method proposed by the present invention relates to the formation of a blown container such as that illustrated in FIG. 3 by reference numeral 10, and including an exterior intaglic profile or decoration 20. More generally, however, the method relates to the formation of a blown container having a thin wall section that is expanded proportionately with the thicker wall sections of a preform during a stretch-and-blow or blow molding operation. As previously discussed, this method is particularly suitable for polyethylene terephthalate material because of that material's ability to achieve extensive strain hardening during a blow molding operation.

Accordingly, this method offers significant utility in the formation of exterior surface profiles on blown containers, such as spirals, flutes, grooves, patterns, logos, indicia and other decoration.

Referring to FIG. 1, the method of this invention includes enclosing a blowable thermoplastic preform 30 within a blow mold cavity 40 defined by closed mold sections 42 and 44. It will be understood that the mold sections are opened and closed by suitable power means (not shown) such as hydraulic rams. Additionally, the blow molds include a finish-forming region 45 which forms a neck or finish 12 on the blown container.

The thermoplastic preform 30, when positioned within the mold cavity, includes an external surface intaglio contour or profile 32, which may be formed by various techniques, as desirable. For example, the surface indentation may be formed on the preform during an injection molding step or may be cut or otherwise formed in the preform prior to the blow molding step.

After the sections 42 and 44 have closed around the preform 30, a blow rod 50 having a fluid supply passageway 52 is axially inserted into the neck portion of the preform. Thereafter, blow fluid under pressure is injected into the interior of the preform 30 by way of passageway 52, thereby expanding the preform outwardly into contact with the mold cavity 40 and forming the blown body portion 14 of the container. This blow molding operation and the behavior of the thermoplastic material in the region of the exterior intaglio indentation 32 are illustrated particularly in FIGS. 4–7.

FIG. 4 illustrates the plastic preform just prior to striking the mold wall surface 40. As shown, the exterior indentation 32 has expanded essentially to the size of the intaglio surface decoration 20, with the material having necked down slightly at the juncture 31 between the preform thicknesses 30 and 32. FIG. 5 illustrates the plastic material at the moment when it strikes the smooth mold wall surface 40, with the plastic material having been stretched and expanded only slightly from its configuration of FIG. 4. FIG. 6 illustrates what is believed to occur when the full blowing pressure within the blown article 40 has developed, causing the plastic material in the region of the intaglio surface decoration 20 to be pressed against the mold wall surface 40. This blowing pressure may be relieved within a short time by venting the interior of the blown shape, permitting the plastic material in the region of the surface intaglio 20 to return essentially to its position of FIGS. 4 and 5, as shown in FIG. 7. It is believed that this inward retraction of the plastic material at the intaglio occurs for two reasons. First, the plastic material preferred for this invention, polyethylene terephthalate, strain hardens during the stretching operation under proper stretching conditions, and therefore has an elastic memory for its original position; and second, the intaglio has a greater surface area than the corresponding mold surface area against which it is blown, tending to discourage the material from being pressed into that region.

Upon completion of the blowing operation, the intaglio surface design 32 is stretched and expanded substantially proportionately with the other portions of the preform to form intaglio surface design 20, even though this preform portion is thinner than the remaining preform portions. It is believed that the exterior surface indentation is achieved in the present invention and that the proportional expansion occurs because polyethylene terephthalate material is susceptible to strain hardening during the blow molding operation. In order to achieve the strain hardening, however, the blow molding conditions should be maintained to within certain specified conditions. For example, the pressure of the blowing fluid should be within the range of from about 100 to 600 psi. Most preferably, the parison is expanded in response to an initial lower pressure and then to a final high pressure in order to achieve good bottle characteristics, particularly clarity and uniform expansion. The initial low pressure is applied for about one-half second or more and is in the range of about 150 to 200 psi. The final high pressure is in the range of about 350 to 550 psi. These pressures may be regulated by suitable regulator controls and flow valves (not shown) which do not form a part of the present invention.

Depending upon the particular molecular weight (or inherent viscosity) of the material, the parison should be thermally conditioned to have a temperature broadly within the range of between about 75 degrees C. and 110 degrees C. This temperature range is particularly suitable for polyethylene terephthalate having an inherent viscosity of between about 0.5 and about 0.9 with the lower inherent viscosity materials generally requiring lower temperatures. Additionally, the expansion rate for the material should preferably be about one inch per inch per second; that is, the material should be stretched about one inch per second for every inch of starting length. Of course, these parameters and conditions may vary in different environments and different operations.

In FIGS. 8 and 9, the proportionate relationship between the corresponding preform and final container portions is schematically emphasized. By way of explanation, $X_0$ indicates the thickness of the thin preform portion corresponding to the surface indentation 32; $Y_0$ indicates the thickness of the preform wall 30; and $Z_0$ indicates the length of the thin preform wall portion. Likewise, $X_1$, refers to the thickness of the thin container portion, corresponding to the surface indentation 20; $Y_1$ indicates the thickness of the blown container wall 14 adjacent the surface indentation; and $Z_1$ indicates the length of the thin container wall portion. Although not shown, $W_0$ and $W_1$ are intended to respectively designate the widths of the thin preform wall portion and of the thin container wall portion. Accordingly, $Z_0W_0$ and $Z_1W_1$ represents the respective surface areas of the thin preform wall portion and the thin container wall portion.

In accordance with the present invention, the ratios between the corresponding thicknesses of the preform and container are essentially equivalent. That is:

$$\frac{X_0}{X_1} \simeq \frac{Y_0}{Y_1}$$

Additionally, the ratio of the thin preform portion to the thick preform portion is essentially equal to the ratio of the corresponding containers portions with respect to one another. That is:

$$\frac{X_0}{Y_0} \simeq \frac{X_1}{Y_1}$$

Further, the ratios between the corresponding thicknesses of the preform and container are essentially equivalent to the ratio of the final indentation surface area after stretching to the original indentation surface area. That is:

$$\frac{X_0}{X_1} \simeq \frac{Y_0}{Y_1} \simeq \frac{Z_1W_1}{Z_0W_0}$$

It is to be understood that the foregoing disclosure is exemplary in nature, rather than limiting. For example, the invention has been disclosed primarily in reference to polyethylene terephthalate material. However, the invention is equally adaptable to similar types of thermoplastic materials which are susceptible to proportionately expanding different wall thickness portions during stretching, such as in a blow molding operation.

Additionally, the blow molding operation may include an axial stretching step in order (1) to proportionately expand the preform and exterior indentation in the axial and radial directions and (2) to biaxially orient the material. Such an operation may be preformed by either stretching the preform prior to or during the introduction of blow fluid into the preform, as is known in the art, reference being made to U.S. Pat. No. 3,865,530, incorporated by reference.

Having therefore completely and fully disclosed my invention, I now claim:

1. In a method of forming a blown shape of polyethylene terephthalate having an exterior intaglio surface design, the steps of:
    forming a blowable preform of polyethylene terephthalate having an exterior intaglio surface design defined by adjacent thick and thin wall portions destined to form the intaglio design in the blown container;
    enclosing the blowable preform within a blow mold cavity having a smooth wall portion;
    thermally conditioning the preform to a temperature in a range where the material is susceptible to strain hardening;
    introducing blow fluid under pressure into the interior of the preform and thereby (1) expanding the preform outwardly to conform to said cavity, including contacting both the thick and thin wall portions of said design with said blow mold cavity wall portion, (2) strain hardening the preform, and (3), proportionately expanding the thick and thin portions of said design; and thereafter venting fluid under pressure from the interior of said blown shape to allow removal from the mold of the blown shape having said exterior intaglio surface design.

2. A method of blow molding a container having an exterior intaglio indentation, by the steps of:
    providing a blowable preform of polyethylene terephthalate with an exterior intaglio design,
    thermally conditioning the blowable preform of polyethylene terephthalate to a temperature within a range where the material is susceptible to strain hardening;
    enclosing the thermally conditioned blowable preform within a blow mold cavity having a smooth wall surface in a region corresponding to that portion of the container which will include the exterior intaglio surface indentation, the preform having an exterior intaglio surface indentation which is smaller than the exterior indentation on the container that it is destined to form; and
    establishing a pressure differential between the interior and exterior of the preform and thereby (a) expanding the material outwardly toward and against the mold walls, (b) strain hardening the material, and (c) proportionately expanding that portion of the preform including the intaglio surface indentation with respect to the adjacent preform portions, and
    terminating said pressure differential,
    said method forming a blown container having an exterior intaglio surface design corresponding to and proportionately larger than the exterior design of the preform.

3. In a method of forming a blown container of polyethylene terephthalate having a region of predetermined variant all thicknesses, the steps of:
    (a) forming a blowable preform of polyethylene terephthalate material having a region of variant wall thicknesses destined to form said region in the blown container and thereby providing an exterior design thereon;
    (b) thermally conditioning the preform to a temperature in a range where the material is susceptible to strain hardening;
    (c) surrounding the blowable preform with a blow mold cavity having a smooth wall portion;
    (d) introducing blow fluid under pressure into the blowable preform to expand the preform into the blow mold cavity, including contacting the region of variant wall thicknesses with said smooth wall portion, to form the blown container having the exterior design similar to but larger than the exterior design of the preform;
    (e) the performance of Step (d) resulting in strain hardening of the polyethylene terephthalate material and proportionately stretching the variant wall thickness portions in said preform region to achieve said container region of predetermined variant wall thicknesses, with the ratio of the thicknesses of the different wall portions in said container region to one another being substantially the same as the ratio of the corresponding thicknesses of the different wall portions in the preform region to one another, and releasing said blow fluid pressure from the container to allow removal of said container from said mold.

4. A method of forming a polyethylene terephthalate bottle having a region of adjacent, integral segments with different wall thicknesses to provide an exterior design, comprising the steps of:

forming an essentially tubular, blowable polyethylene terephthalate parison with a region of adjacent, integral segments having different wall thicknesses to form an exterior preform design;

thermally conditioning the parison to a temperature within a range where the material is susceptible to strain hardening; and enclosing the parison within a blow mold cavity having a smooth wall portion, expanding the parison internally of said blow mold cavity, including contacting the region of different wall thickness with said smooth wall portion, to form a blown bottle having an exterior design proportionately larger than the exterior design of the preform, the bottle having said region of different wall thicknesses, the expanding providing proportionate stretching of the different segments of the parison so that the ratio of segment thickness in the parison to the corresponding segment thickness in the bottle is essentially the same for each of the various, corresponding segments, and subsequently removing said bottle from said mold.

5. The method as defined in claim 4, wherein the expanding step includes mechanically stretching the parison along its longitudinal axis and radially expanding the preform by introducing fluid under pressure into its interior.

6. In a method of forming a plastic container having an intaglio surface decoration on a blown body portion surmounted by a neck, the steps of:

providing a blowable polyethylene terephthalate preform having a profiled exterior intaglio surface decoration defined by exterior surface indentations forming preform wall sections which are thinner than the remaining preform wall sections, closing the sections of a blow mold around the preform at a temperature within the range from about 75 degrees C. to about 110 degrees C. where the material is susceptible to strain hardening, the mold sections including respective neck defining portions which are closed into engagement with a portion of the preform to form the container neck;

in an essentially single operation, injecting blow fluid at a pressure of between about 100 psi and about 600 psi into the interior of the preform, expanding the preform outwardly to conform to said cavity, at a rate of about one inch per inch second, strain hardening the polyethylene terephthalate material, stretching the thin wall sections of the preform essentially proportionately to the remaining wall sections of the preform, the profiled preform intaglio surface region being expanded against an essentially smooth mold wall surface on the mold sections, venting the fluid under pressure from the interior of the blown container to provide the blown container with said intaglio surface decoration on the exterior of the blown container, and thereafter opening the mold sections to expose the blown container.

7. In a method of forming a polyethylene terephthalate container having a blown body portion including a region of at least two adjacent wall sections with different thicknesses, the steps of:

forming a blowable polyethylene terephthalate preform having an exterior design defined by a region of at least two adjacent wall sections of different thicknesses;

thermally conditioning the preform to a temperature within a range where the material is susceptible to strain hardening;

closing the sections of a blow mold having a smooth wall portion around the blowable preform of polyethylene terephthalate and thereby enclosing the preform within a blow mold cavity, the thinner of the two wall sections of the preform having a thickness $X_0$, the thicker of the two wall sections of the preform having a thickness $Y_0$, and the surface area of the thinner wall section being $W_0Z_0$;

injecting bow fluid under pressure into the interior of the preform, and in an essentially single operation, expanding the preform outwardly into contact with the mold walls, including contact of said design region with said smooth wall portion, thereby strain hardening the polyethylene terephthalate material and proportionately and symmetrically stretching said thinner and thicker sections of the preform region to form said region of the blown container with an exterior design formed from said region of said preform but proportionately larger than the exterior preform design, with the thinner of the wall sections in the container having a thickness $X_1$, the thicker of the wall sections having a thickness $Y_1$, and the surface area of the thinner wall section being essentially $W_1Z_1$; whereby the relationship between the regions of the preform and the container are substantially proportionate due to the proportionate stretching, as follows:

$$\frac{X_0}{X_1} \simeq \frac{Y_0}{Y_1} \simeq \frac{W_1Z_1}{W_0Z_0}.$$

8. The method as defined in claim 7, wherein (a) the preform is formed of polyethylene terephthalate having an inherent viscosity within the range of between about 0.5 and about 0.9 (b) the blow fluid is injected into the preform at a pressure of between about 100 and about 600 psi, (c) the preform is at a temperature during the expansion step of between about 75 degrees C. and about 110 degrees C. and (d) the preform is expanded at a rate of about one inch per inch-second.

* * * * *

UNITED STATES PATENT OFFICE
CERTIFICATE OF CORRECTION

PATENT NO. : 4,233,262
DATED : Nov. 11, 1980
INVENTOR(S) : Nicholas J. Curto

It is certified that error appears in the above-identified patent and that said Letters Patent are hereby corrected as shown below:

Col. 1, line 7, "Jul. 21" should be ---April 21---.
Col. 2, line 54, "mols" should be ---molds---.
Col. 3, line 21, "intaglic" should be ---intaglio---.
Col. 5, line 46 "preformed" should be ---performed---.

*Signed and Sealed this*

*Fourteenth* Day of *April 1981*

[SEAL]

*Attest:*

RENE D. TEGTMEYER

*Attesting Officer*  *Acting Commissioner of Patents and Trademarks*